3,537,870
PROCESS FOR THE POSTTREATMENT OF TITANIUM DIOXIDE PIGMENT
Helmut Grohmann and Achim Kulling, Opladen, Germany, assignors to Titangesellschaft mbH, Leverkusen, Germany, a corporation of Germany
No Drawing. Filed Oct. 27, 1967, Ser. No. 678,545
Claims priority, application Germany, Feb. 3, 1967, T 33,144
Int. Cl. C09c 1/36
U.S. Cl. 106—300           7 Claims

ABSTRACT OF THE DISCLOSURE

This invention covers a process for the dry posttreatment of titanium dioxide pigments with inorganic oxidic compounds the coating process being carried out while the titanium dioxide pigment is suspended in a fluidized state.

BACKGROUND OF THE INVENTION

Up to now the coating of titanium dioxide pigments has been done by precipitating hydrated oxides from the corresponding salt solution in an aqueous pigment suspension. The precipitate separates out as a thin layer on the individual pigment particles and the flocculated suspension is filtered and the pigment dried. With a subsequent milling the treatment is finished but it may be repeated. This type of posttreatment includes the expensive processing operations of filtering, drying and milling.

The usual "wet" process seems particularly unfavorable in the posttreatment of titanium dioxide pigments that had been obtained in dry, fine particle size form by vapor phase combustion of titanium tetrachloride. These pigments must first be brought into aqueous suspension and then dried again and milled. It is desirable therefore to avoid the aqueous phase especially with pigments produced by the vapor phase process, albeit not exclusive of pigments produced in the sulfuric acid process by wet precipitation, and to carry out the coating of the pigment with posttreatment substances in a dry manner, for example, by precipitating the posttreatment substances from the vapor phase onto the pigment body. A suitable medium for such a gas-solid reaction is afforded by the fluidized bed type reactor.

In the prior art it is known to treat, in a fluidized bed, fine particle size metal oxides that had been produced by the reaction of metal halides or metalloid halides with gases containing oxygen. The suggestion had been made, for example, to neutralize highly dispersed metal oxides, by passing steam through a turbulent or fluidized bed charged with the oxides (German patent application No. 1,150,955). According to another process, vaporized boric acid is added to the steam (German patent application No. 1,121,249).

However, these processes do not serve to coat the metal oxides, but solely to remove obnoxious acid residues or other impurities such as adsorbed chlorine.

It is known, furthermore, that highly dispersed metal oxides can be rendered hydrophobic, after previous removal of hydrochloric acid, chlorine and adsorbed water in a turbulent bed with exclusion of oxygen, by reacting the free or liberated OH groups on the surfaces of the metal oxides with silanes (German patent application No. 1,163,784). In the event the metal oxides are reacted, according to thes ame procedure with the corresponding metal halides instead of with silanes, stable and cross-linked agglomerates of the metal oxides are obtained instead of a coating on the individual pigment particles.

Furthermore, a process is known for the production of a titanium dioxide-aluminum oxide composition pigment (German patent application No. 1,184,030) wherein by the introduction of aluminum chloride vapor into a hot titanium dioxide suspension containing chlorine and some oxygen, as it is obtained directly in the vapor phase reaction of titanium tetrachloride with oxygen, a reaction occurs first between the titanium dioxide and the aluminum chloride with the formation of an aluminum oxide layer on the pigment. However titanium tetrachloride is also formed which subsequently reacts with water vapor whereby a coating of titanium dioxide is formed on the aluminum oxide.

SUMMARY OF THE INVENTION

In contrast to these prior art processes, the present invention consists in providing titanium dioxide pigment particles, which have been produced either by the vapor phase reaction of titanium tetrachloride with oxygen or gases containing oxygen and separated from the reaction product gases, or as titanium dioxide pigment obtained by the sulfuric acid process, with a dense coating of one or more inorganic oxidic compounds.

According to the invention, such coatings are obtained by separate introduction of steam and inorganic halides in vapor form into a hot fluidized bed (100–600° C.) of the titanium dioxide pigment to be treated. In this the oxidic compounds are formed by hydrolysis of the inorganic halides and precipitated on the surface of the pigment.

Suitable for this treatment are easily volatilized inorganic halides which hydrolyze easily at the temperatures stated and form colorless oxides, especially the chlorides of aluminum, silicon and titanium which may be applied either alone or successively or in mixture with each other.

DESCRIPTION OF THE PREFERRED EMBODIMENT

The preferred form of carrying out the invention is the alternating treatment of the suspended titanium dioxide pigment with steam and an inorganic halide. When introducing steam into the fluidized bed, the pigment surfaces are charged with a water film which then reacts with the subsequently introduced inorganic halide vapor. This alternating introduction of steam and inorganic halide vapor is continued until a coating of the desired thickness has been formed around the pigment particle. As can be shown by electron-micrograph, the coating formed in this way is considerably denser and stronger than a coating formed by a conventional "wet" posttreatment and this is probably due to the fact that during the alternating treatment each successive oxide layer is subjected to a certain tempering.

The coating effect obtained with the alternating treatment is also better than that obtained with the simultaneous introduction of steam and halide vapor. In this instance the hydrated oxide forms not only on the pigment surface but also as separate particles in the free gas space so that the product obtained comprises both these discrete fine particles of hydrated oxide and the oxide coated pigment particles, as has been confirmed also by electron microscopy.

The posttreatment according to the process of the invention is carried out, for example, in such a way that a vapor phase pigment is fluidized in an air current using a fluidized bed reactor, for example, according to the German Pat. No. 1,147,207, and is brought up to the temperature necessary for the reaction, i.e., 100–600° C., preferably from 200–400° C. Into the fluidized pigment bed steam and then a vaporous inorganic halide, for example, aluminum chloride, are introduced alternatingly the dry air serving as a carrier gas. Prior to alternating from steam to vaporous aluminum chloride or vice versa, air must be blown through the bed for a short period of time in order to make certain that only the water and he inorganic halide absorbed on the pigment surface remains in the bed so that the hydrolysis can take place only on the surface of the pigment particles.

The inorganic oxide thus formed separates out quantitatively as a coating on the pigment body. The duration of the individual phases of introduction may be varied, as the ratio of steam to air. Expediently the air charged with steam and the air charged with the inorganic halide are, in each instance, passed through the fluidized bed for several minutes. This operation may be repeated several times. The number of repetitions depends on the amount of the coating to be applied. However, it is also possible with sufficiently long duration of the individual phases to precipitate the entire amount of coating in one charge only. This is particularly possible where the intention is to coat the pigment with one inorganic oxide only. In case several inorganic oxides are to be coated on the pigment, the dry air may be charged, for the halide phase in each case, with a different halide, for example, first with aluminum trichloride, then with silicon tetrachloride and finally with titanium tetrachloride. Naturally, the sequence may be varied. Alternatively, the various halides may be used in mixture and be introduced simultaneously.

The hydrochloric acid formed during hydrolysis in the process according to the invention leaves the turbulent bed immediately together with the fluidizing gas and hence is not adsorbed on the surface of the pigment. Consequently the pH value of the pigment employed is not lowered. For this reason no subsequent neutralization step needs to be carried out in those instances where neutral pigments are employed. When acid pigments are subjected to the process according to the invention, it has been found that their pH value is even increased. It will be understood however that after coating a pigment a neutralization step may follow in the way known, if necessary. The halides are employed in amounts which correspond to ca. 1 to 10%, calculated as the inorganic oxide, based on the weight of the titanium dioxide employed. The treatment may be carried out discontinuously as well as continuously. In the latter case the process is carried out expediently in several directly connected fluidized beds.

The following examples will explain the invention in more detail: 100 g. titanium dioxide pigment manufactured by combustion of titanium tetrachloride were placed into a fluidized bed reactor heated to 200° C. From below a hot gas mixture at 200° C. of equal parts by volume of steam and air flowed up through a fritted layer into the reaction space fluidizing the pigment. At the same time a dry hot air current was blown up through a pipe penetrating through the center of the fritted layer, for the purpose of maintaining the pipe, which served for subsequent introduction of vaporous aluminum chloride, free of bed material. Sufficient air to keep the bed fluidized was blown in at all times.

After ten minutes the steam in the air-steam mixture passing through the fritted layer was replaced by a corresponding volume of air having the same temperature. A few seconds later vaporous aluminum chloride was fed with the air current passing through the center of the fritted layer for 10 minutes. Subsequently a steam-air mixture was passed through the frit after blowing air through it for a short time. This alternating treatment with steam and vaporous aluminum chloride was repeated so that the pigment had gone through the following treatment steps at the end of the posttreatmen:

10 minutes—air+steam
several seconds—air
10 minutes—air+$Al_2Cl_6$ vapor
several seconds—air
10 minutes—air+steam
several seconds—air
10 minutes—air+$Al_2Cl_6$ vapor
several seconds—air
10 minutes—air+steam Total duration of treatment ca. 50 minutes.

A total of 4 g. $AlCl_3$, calculated as $Al_2O_3$, was introduced into the pigment bed; the amount coated on the pigment by this procedure was 3.5% $Al_2O_3$, as determined by analysis:

The pigment obtained was compared with a pigment coated in the known manner by wet precipitation with the same amount of $Al_2O_3$. The starting $TiO_2$ material for this coating in aqueous phase was the same vapor phase pigment as in the example just described. Both treated pigments were also compared with the untreated pigment. It was found that the dry posttreated pigment as well as the wet posttreated pigment exhibited an improvement in gloss stability and chalking resistance over the untreated pigment. However the improvement in gloss of the dry posttreatment pigment was considerably stronger, as can be seen from the testing results shown in the following table.

In order to test the pigments, air-drying varnishes were prepared using a long-oil linseed oil alkyd as vehicle and a pigmentation corresponding to a pigment-volume concentration of 15%. These coatings were exposed in a weatherometer under a carbon arc lamp and subsequently tested.

The gloss was measured with a gloss-meter, standardized by means of a black gloss standard with the value 70, at 45°, each time prior to the weathering test (starting gloss $G_o$ absolute.) and after an exposure of 230 hours ($G_{230}$ abs.). $G_{230}$ rel. is the value measured after 230 hours expressed in percent of the starting gloss. The measurement of chalking takes place according to the method of Kempf, described in DIN-Norm 53,159 but the evaluation was carried out not with the aid of a 5-step scale as in that method but, for the sake of better differentiation, with the aid of a 10-step chalking scale. In this scale the chalking step 10 signifies zero chalking; chalking step 1 maximum chalking. The sum of chalking, $\Sigma K$, designates the sum of all measured chalking steps from the beginning to the end of weathering.

This good weathering stability is presumably due to the denser structure of the oxidic coatings formed by the method of this invention in comparison to oxidic coatings formed by conventional wet treatments. When comparing the electron micrograph of the two pigments coated with 3.5% $Al_2O_3$ in each case, it can be seen clearly from the table that the wet treatment produces scaly coats whereas the dry treatment of this invention forms uniform, dense coats on the pigment which is to be considered an additional advantage of the process according to the invention.

TABLE

| TiO₂ pigment | Al₂O₃ content, percent | Gloss stability | | |
|---|---|---|---|---|
| | | Initial gloss, $G_c$ abs. | Residual gloss | |
| | | | $G_{230}$ abs. | $G_{230}$ rel., percent |
| Untreated | | 63.5 | 31.5 | 50 |
| Wet posttreatment | 3.5 | 70 | 56.1 | 80 |
| Dry posttreatment | 3.5 | 70 | 59.0 | 84 |

| TiO₂ pigment | Al₂O₃ content, percent | Chalking resistance | | |
|---|---|---|---|---|
| | | ΣK | K after 500 hrs. exposure | Exposure hrs. up to chalking step 8 |
| Untreated | | 39 | 2 | 250 |
| Wet posttreatment | 3.5 | 63 | 8 | 480 |
| Dry posttreatment | 3.5 | 79 | 9 | 560 |

While this invention has been described and illustrated by the examples shown, it is not intended to be strictly limited thereto, and other variations and modifications may be employed within the scope of the following claims.

We claim:

1. Process for the posttreatment of titanium dioxide pigment by coating the surfaces of the individual pigment particles with a dense inorganic oxidic coating, characterized in that the oxidic coating is produced by introducing steam and an inorganic halide separately into a fluidized bed of titanium dioxide pigment at 100° C.–600° C. temperature and hydrolyzing the inorganic halide on the pigment surface, the amount of said inorganic halide added is 1% to 10%, calculated in the inorganic oxide, based on the weight of the titanium dioxide employed.

2. Process according to claim 1 in which the inorganic halide employed is selected from the group consisting of aluminum chloride, silicon tetrachloride, titanium tetrachloride and mixtures thereof.

3. Process according to claim 1, characterized in that the steam and the inorganic halide are passed, preferably alternately, into the fluidized bed.

4. Process according to claim 1, characterized in that air is used for fluidizing the bed and as carrier gas for the inorganic halide.

5. Process according to claim 1, characterized in that the treatment is preferably carried out at 200–400° C.

6. Proces according to claim 1, characterized in that several different inorganic halides are passed into the fluidized bed successively or in mixture with each other.

7. Process according to claim 1 characterized in that several different inorganic halides are introduced into the fluidized bed in such amounts and until such time that the pigment will be coated with 1–10% of the corresponding inorganic oxidic compounds.

References Cited

UNITED STATES PATENTS

| 2,512,079 | 6/1950 | Werner | 23—202 |
| 3,036,926 | 5/1962 | Hughes | 106—300 |
| 3,060,001 | 10/1962 | Hughes et al. | 106—300 XR |
| 3,088,840 | 5/1963 | Arkless et al. | 106—300 |
| 3,112,210 | 11/1963 | Carpenter | 106—300 |
| 3,253,889 | 5/1966 | Wildt et al. | 106—300 XR |

HELEN M. McCARTHY, Primary Examiner

H. M. S. SNEED, Assistant Examiner

U.S. Cl. X.R.

106—308